Figure 1:
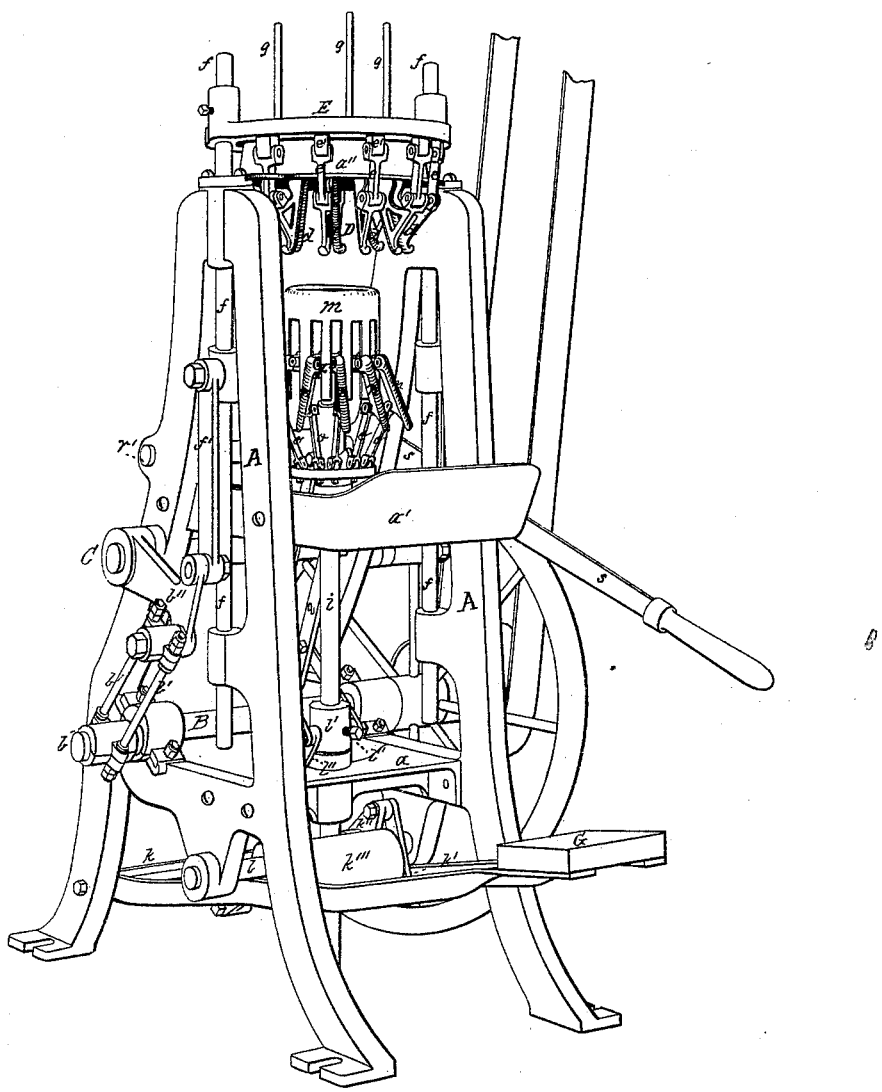

3 Sheets—Sheet 1.

R. EICKEMEYER.
MACHINE FOR STRETCHING HAT-BODIES.

No. 175,953. Patented April 11, 1876.

Witnesses:
Philip F. Larner
A. B. Cauldwell

Inventor:
Rudolf Eickemeyer
By Wm. C. Wood
Attorney

N. PETERS, PHOTO-LITHOGRAPHER, WASHINGTON, D.C.

3 Sheets—Sheet 2.
R. EICKEMEYER.
MACHINE FOR STRETCHING HAT-BODIES.
No. 175,953. Patented April 11, 1876.
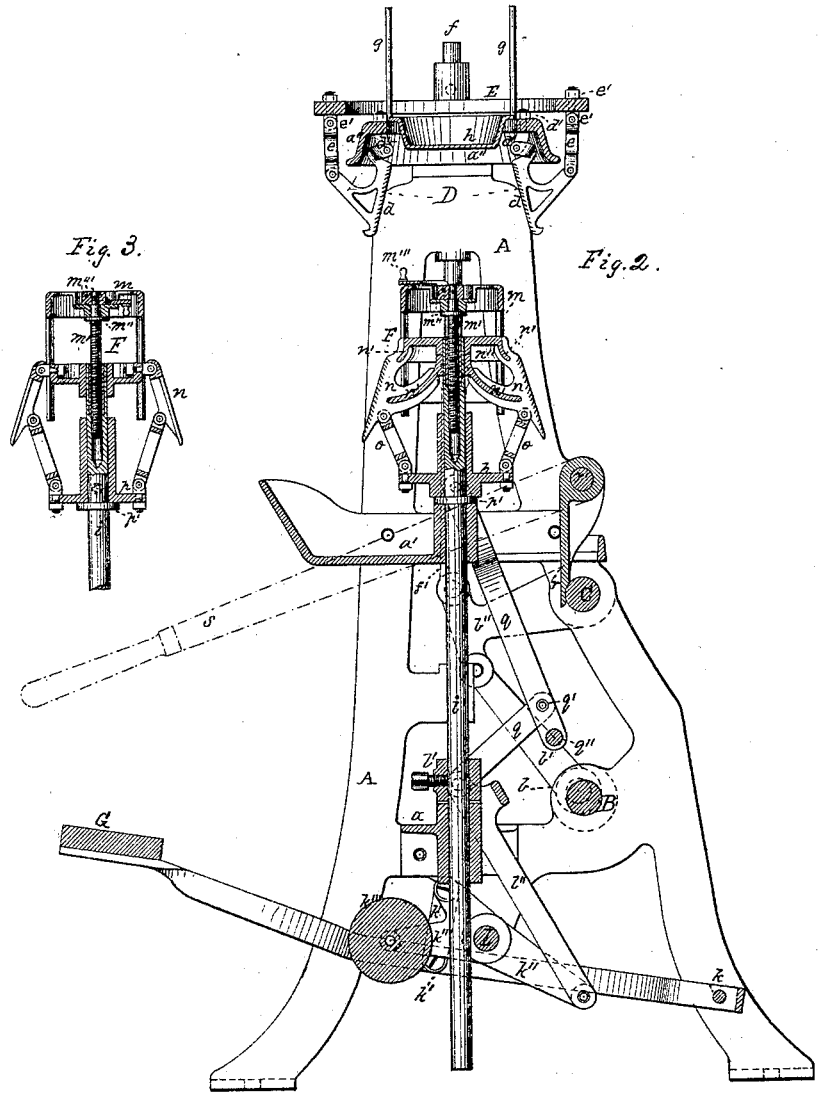
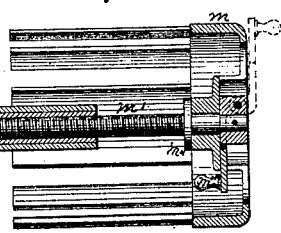
Witnesses:
Philip F. Larner
A. B. Cauldwell
Inventor:
Rudolf Eickemeyer
By Wm. C. Wood
Attorney 3 Sheets—Sheet 3.

R. EICKEMEYER.
MACHINE FOR STRETCHING HAT-BODIES.

No. 175,953. Patented April 11, 1876.

Witnesses:
Philip F. Larner
A. B. Cauldwell

Inventor:
Rudolf Eickemeyer
By M^c Cord
Attorney

UNITED STATES PATENT OFFICE.

RUDOLF EICKEMEYER, OF YONKERS, NEW YORK.

IMPROVEMENT IN MACHINES FOR STRETCHING HAT-BODIES.

Specification forming part of Letters Patent No. 175,953, dated April 11, 1876; application filed March 4, 1876.

*To all whom it may concern:*

Be it known that I, RUDOLF EICKEMEYER, of Yonkers, in the county of Westchester and State of New York, have invented certain new and useful Improvements in Machines for Stretching Hats; and I do hereby declare that the following specification, taken in connection with the drawings furnished and forming a part of the same, is a clear, true, and complete description of my invention, and of a machine embodying the several features thereof.

My present improvements relate to stretching and developing the brims of hats; and I seek, and have practically attained thereby, a machine in which the requisite power exerted for stretching the brims of hats is derived from any suitable motor, and in which the hat may be gradually subjected to the action of the brim-stretching devices, at the will of the operative.

In machines heretofore invented and patented by me—as, for instance, see Letters Patent No. 91,730, dated June 22, 1869—the tip and brim are both stretched and developed through the operation of any ordinary motor. In said machines, however, the hat-body is carried on a set of stretching-ribs, mechanically or automatically reciprocated vertically to and from a set of co-operative stretching devices which in themselves have no movement.

One of the novel characteristics of my present improved machine consists in a series of automatically-reciprocating brim-stretching fingers, arranged in the same horizontal plane, equidistant from each other, in a circular line, each operating toward and from a common center in a different vertical plane.

Another novel feature in my present machine consists in the combination, with the reciprocating brim-stretching fingers, of a ribbed "former," which is rendered controllable by the operative by means of a treadle or equivalent device, and which can, when supporting a hat, be moved upward, and thereby subject the brim of the hat to the combined stretching action of the ribs on the former and the reciprocating fingers before referred to.

Still another novel feature consists in the combination, with the automatically reciprocating or vibrating stretching-fingers, of a former having inclined ribs and mechanism, for gradually spreading said ribs by elevating their lower or outer ends, whereby the vibrating stretching-fingers are enabled, by the co-operation of said ribs, to develop the brim of a hat to any required extent.

Brim-stretching ribs on a vertically-reciprocating spindle have heretofore been combined with spreading mechanism in a machine having a series of stationary brim-stretching fingers. In those machines the labor of stretching the brim is executed by the vertical movement of the spindle, while in this machine it is performed by the reciprocation of the fingers.

There are numerous other novel features of a minor character, which will be hereafter definitely pointed out, and to more fully describe my invention I will refer to the accompanying drawings, in which—

Figure 6:
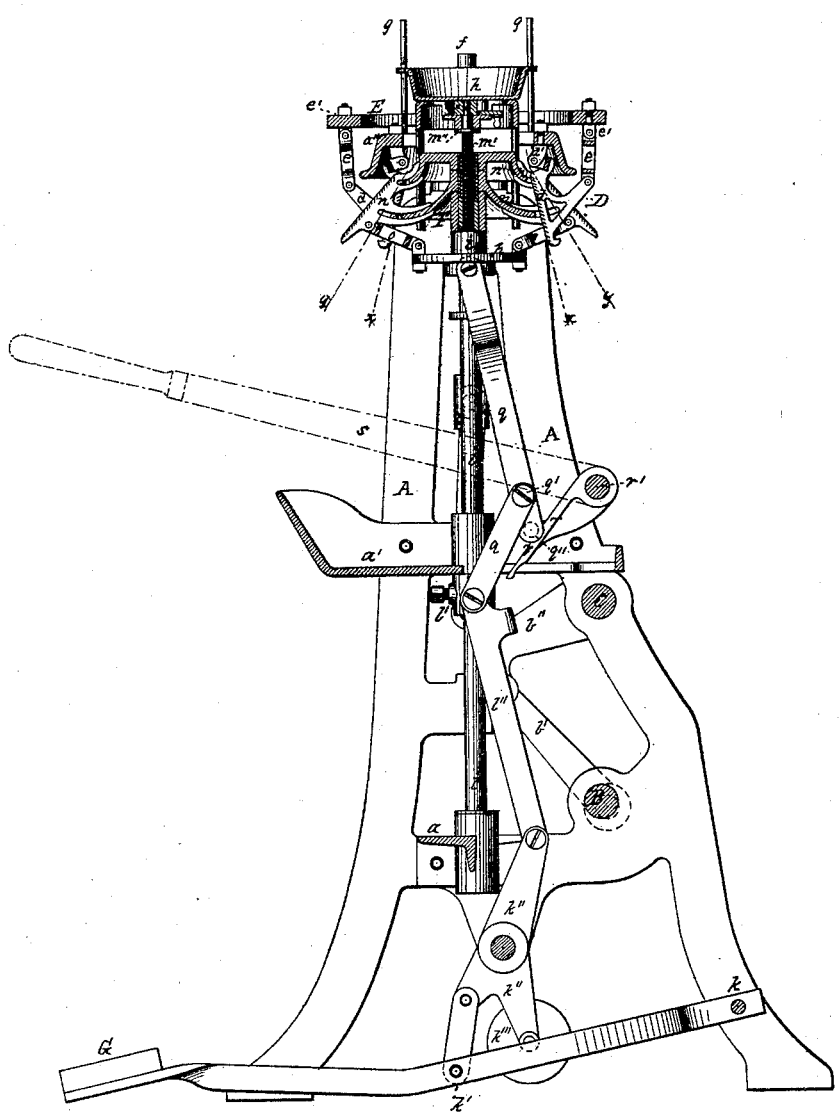

Figure 1 represents, in perspective, a machine embodying my present improvements. Fig. 2 represents the same in central vertical longitudinal section, with the ribbed former in its lowest position, ready to receive a hat-body, and with its ribs unspread. Fig. 3 represents, in central vertical section, a ribbed former, of a construction somewhat different from that shown in Fig. 2. Figs. 4 and 5 represent, in top view and in central section, respectively, the body of the former, and illustrate a valuable mode of mounting the same on its sliding spindle. Fig. 6 represents, as in Fig. 2, in central vertical longitudinal section, the same machine, with the ribbed former elevated, as if with a hat thereon, and with its ribs fully spread.

The frame at A is composed of two duplicated side plates of proper form and strength, a cross-plate at *a*, near the bottom of the machine, a central pan-shaped plate at *a'*, (which also serves as a receptacle for the water which drips from the wet hats,) and an annular laterally-flanged top plate at *a''*, to which a portion of the stretching mechanism is attached, and which unites, at the top, the two side plates of the machine. B denotes the driving-shaft of the machine, which is provided with suitable fast and loose pulleys, or their equivalents, for receiving power from any adjacent driving-shaft in a shop or factory. At one end of the driving shaft is an eccentric, as at $b$, to which a rod or rods, as at $b'$, are attached, which, in turn, are pivoted to a lever, as at $b''$, which is keyed to a lateral rock-shaft at C, which has suitable journal-boxes in each side plate. D denotes the automatically-vibrating brim-stretching fingers, when considered as a whole. They are all connected to the annular top plate $a''$ of the machine. In the machine shown, twelve of these stretching-fingers are employed, as designated in several instances at $d$. These may be varied in construction; but I prefer that they have the general triangular form shown. The working-surface of each finger is inclined outward, but is straight and has a laterally-rounded serrated surface, and is also outwardly curved at the lower end, to enable it to properly engage with the hat-brim. At their upper ends they are, in each instance, pivoted to an eyebolt at $d'$, which is provided with a nut for securing it to the annular top plate $a''$. Each stretching-finger is linked, as at $e$, to an eyebolt at $e'$, by means of which it is secured to the annular finger-plate E, through which the lower ends of the several fingers are vibrated toward and from a common center. The finger-plate E has a hollow neck on each side, provided with a set-nut, whereby said plate is secured to the two vertically-sliding rods $f$, which are located one on each side of the machine, and are provided with suitable guides in or on the side plates. These rods $f$ are actuated by the rock-shaft C, with which they are connected by means of the links at $f'$, and the lever at $b''$, on one end of the rock-shaft, and a similar one on the opposite end thereof.

From the description thus far it will be readily seen that the rotation of the driving or main shaft B will, through the rock-shaft, the levers, and reciprocating rods, impart to the finger-plate E a vertically-reciprocating motion, which will result in the simultaneous vibration of the several stretching-fingers. It is important in practice that these fingers be separately readily removable, and this capacity is attained in my machine by means of the eyebolts and nuts, which peculiar construction constitutes one of the detailed features of my present invention.

The top plate $a''$ of the frame of the machine is provided with three vertical stationary guiding-rods, as at $g$, which serve as guides for a stripping-weight, as at $h$, which serves as a means for clearing the hat from the stretching-fingers, under circumstances hereafter fully set forth. This weight, in combination with the stretching-fingers and ribbed former, constitutes a feature of my invention.

F denotes the ribbed former, considered as a complete device. Its details will be specifically described hereafter. This former is mounted on a vertically-sliding centrally-located spindle, as at $i$, provided with suitable guides in the lower cross-plate $a$ and central pan-plate $a'$, which constitute lateral portions of the frame of the machine.

The treadle G has two side pieces, which are pivoted, at their rear ends, to the lateral rod or shaft at $k$, and each side piece is linked near its middle, at $k'$, to two parallel levers at $k''$, mounted on a lateral rock-shaft at $l$. The spindle $i$ has a fixed cross-head at $l'$, which is connected with the rock-shaft levers $k''$ by the two rods $l''$. To counter-balance the weight of the spindle, the former, and the levers, a weight, as at $k'''$, is attached to the front ends of the rock-shaft levers $k''$.

Considering the ribbed former without reference to its complex details, it will readily be seen that when the treadle is depressed the rear ends of levers $k''$ are raised, and that thereby, through the connection therewith of the cross-head $l'$ and rods $l''$, the spindle and the former will be lifted, and, also, that if, while the brim-stretching fingers are moving, a hat be carried on the former upward thereto, the brim of the hat will be stretched gradually from the time the ribbed former is first brought into working relations with the fingers up to the time when the former is fully elevated.

I will now minutely describe the ribbed former F. A prominent portion thereof is the supporting shell or block at $m$. It resembles a hat-block in form, is composed of metal, and has numerous longitudinal slots in its sides, as clearly shown. It is to be understood that this shell does not perform the blocking function of a hat-block in this machine, but is provided merely for the purpose of so holding or supporting the hat that its brim will occupy a proper position with relation to the brim-stretching ribs. This shell is, therefore, cylindrical in form, and has a supporting-surface at its periphery. The diameter of this supporting-shell is such that it will serve for a small hat, and yet serve as a proper support for hats of the largest sizes. As hats vary in height of crown, and as the sole object of the shell is to properly locate the brim of the hat in the machine, it is important that it be adjustable vertically with relation to the stretching-ribs, and, therefore, one feature of my invention consists in mounting the shell on a threaded spindle, as at $m'$, which is fitted to an internally-threaded socket in the spindle $i$, as is clearly shown in Fig. 5. As the hat-shell cannot be revolved it is necessary that I provide for the revolution of the threaded spindle $m'$, which I do by rotatively connecting the spindle and shell, and providing said spindle with a collar at $m''$, and a folding crank at $m'''$, as fully shown in Figs. 4 and 5. By turning this crank the spindle $m'$ is revolved, and the shell raised or lowered, as the case may be, on the spindle $i$. A recess in the head of the shell receives the folded or jointed crank $m'''$ when not in use, as fully shown. These features constitute in themselves portions of my invention.

The ribs at $n$ on the former correspond in number with the stretching-fingers $d$. They are arranged in one horizontal plane, but each inclines downward and outward. Their working-surfaces are rounded and serrated, so as to properly engage with the hat-brim. They have, like the stretching-fingers, no movement out of the general vertical planes occupied by them, so that when the former is moved up to the stretching-fingers the spaces between the fingers will be occupied by one rib, and the spaces between the ribs be in like manner occupied by a finger.

These ribs $n$ may be variably constructed and combined with the former in several ways, two of which are illustrated in the drawings. In Figs. 2 and 6 they are shown to be somewhat similar in form to the stretching-fingers. Each rib is provided with two curved slots, one near its upper end or pivotal point, and the other, which is a guiding-slot, is located between said point and the lower end. These curved slots are in their outlines segments of two concentric circles, and each slot is loosely fitted to receive a segmental guide, as at $n'$, which, in form, corresponds with the curve of the slot. These guides radiate from a central rib-block, $n''$, common to all of them, which is firmly secured by a screw-thread to the spindle $i$, located within the hat-shell $m$.

It will be seen that by this mode of construction I am enabled to obtain a movement of the ribs which exactly corresponds with the swinging movement of the stretching-fingers, because when the former is in its most elevated position, as shown in Fig. 6, the pivotal point of each rib will be located in a plane occupied by the pivots of the stretching-fingers at the eyebolts $d'$, and, therefore, with this form of construction there is but little, if any, liability of the brim of a hat to slip when the fingers and ribs are co-operatively working thereon.

Another mode of construction is shown in Fig. 3. The ribs $n$ are there shown to be pivoted directly to radiating ears on a central block. When so constructed, the pivotal points of the ribs do not correspond with the pivotal point of the fingers, and, therefore, when the fingers and ribs are in working relations, the hat-brim is not held so securely, and is more liable to slip during the stretching operation; and for this reason I prefer the form of construction first described, although both forms possess practical value. However the ribs may be pivoted to the former, they may be provided with a spring, or so weighted that they will be normally held with their lower ends in their lowest position. The rib-plate hereafter described will operate as a weight for this purpose. The ribs are spread or actuated on their pivots by means of the links $o$, (one to each rib,) which are pivoted, by means of eyebolts and nuts, to a circular rib-plate at $p$, arranged to slide vertically on the spindle $i$, and to abut, at its lower side, upon a fixed collar at $p'$ on said spindle. The circular rib-plate is connected with the cross-head $l'$ on the spindle $i$ in such a manner that the latter does not affect the movement of the ribs, except so far as it affords an abutment for the two parallel lifting-levers $q$, which are each composed of two parts or members—an upper and a lower—pivoted or jointed together, as at $q'$, forming an elbow-joint. The lower ends of the upper portions of levers $q$ extend below the pivotal point $q'$, and are united by a cross-bar, as at $q''$. The spreading of the ribs $n$ of the former F is effected by forcing the levers $q$, at their joint, toward the spindle, and thereby elongating said levers, which movement lifts the rib-plate $p$, and raises the lower ends of the ribs. The spreading action of the ribs is only required when the former is at its full height, and when so raised the cross-bar $q''$ is opposite the lever $r$ on rock-shaft $r'$, which is actuated by the long hand-lever $s$. It will be seen, therefore, that by gradually raising the outer end of the lever $s$ the lower ends of the ribs will be gradually carried outward, or elevated, and thus properly spread.

It will be seen that when the ribbed former is fully elevated the levers on the treadle rock-shaft, and the rods which connect them to the cross-head on the spindle, are placed in such a position that the downward strain or pressure on the former incident to the operation of the stretching-fingers is borne, principally, by the rock-shaft, and not by the foot of the operator on the treadle. In other words, the levers and rods referred to are in a position nearly vertical, and this enables them and the rock-shaft, with which they are connected, and with which they abut, to bear the pressure or strain referred to; and so, in like manner, when the ribs are fully spread, the two parts of lever $q$ assume a position which is nearly a straight line, causing said levers, the cross-head, and the rock-shaft below the cross-head, before referred to, to bear the pressure or strain. As the ribs are spread, the strain thereon proportionally increases, and, by having the jointed levers $q$ thus constructed, the hand-lever $s$ is relieved from undue pressure or strain upon the hand of the operative. These special features in construction also constitute portions of my present invention.

In operating my machine I speed the main shaft up to, say, from two hundred and eighty to three hundred and twenty-five revolutions a minute, which secures to the fingers a like number of vibrations toward and away from the center of the machine. The extent of the vibration may be varied by changing the throw of the crank or eccentric on the main shaft; but I prefer that range of movement indicated by the dotted lines $x\ y$ in Fig. 6.

The hat-shell or supporting-block is set at proper height above the ribs to suit the vertical dimensions of the hat-body, the middle line of the ribs being at about the point of junction between side crown and brim. When the hats are sized wide the hat-shell should be set somewhat lower than when sized narrow, as will be readily demonstrated by brief practice with the machine.

A hat-body, having been previously operated upon in a tip-stretcher, is placed upon the former, with its lower edge resting on the ribs thereof. The treadle is then depressed until the collar above the cross-head on the spindle is in contact with the under side of the lateral pan-shaped portion of the frame of the machine, which places the ribbed former and the hat into working relation with the rapidly-reciprocated stretching-fingers, after which the ribs on the former are fully spread by the movement of the hand-lever. After ten or fifteen operations of the fingers the former is lowered, the hat being kept on the shell by means of the stripping-weight $h$, which is borne by the shell and hat until the former is wholly clear from the fingers. The hat-body is then turned around, so as to present new surfaces to the stretching devices, and the former is again lifted, and so on until the operation is completed and the brim fully developed.

In a machine of this kind I have stretched in thirty seconds, at one operation, four fine fur hats piled together. The stretching being gradually performed, there is practically less danger of injuring the hats than is the case with any other machine for this purpose heretofore known to me.

It is usual for the operative to commence on hats of the largest size of each dozen of size-assorted hats. After the brims of these are stretched, he lowers the block about one-sixth of an inch for operation on the next smaller size, and so on to the smallest. For convenience in ready adjustment of the block, I make its adjusting-screw with six threads to the inch, so that a single turn of the crank results in a proper change of the block for one size of hat to another.

Having thus described my invention, I claim as new and desire to secure by these Letters Patent—

1. The series of automatically-operated brim-stretching fingers, substantially as described, in combination with mechanism for imparting to each of said fingers a reciprocating movement, as and for the purposes specified.

2. The combination, with a series of automatically-operated brim-stretching fingers, of a ribbed former and mechanism for placing the former and the reciprocating fingers, at the will of the operative, into working relations with a hat-body interposed between them, substantially as described.

3. The combination, in a machine for stretching the brims of hats, of a series of automatically-operated brim-stretching fingers, a former provided with stretching-ribs, and mechanism for spreading the ribs, at the will of the operative, substantially as described.

4. The combination, in the former of a hat-brim-stretching machine, of a cylindrical shell or supporting-block, having a supporting-surface at its periphery, with an adjusting-screw, substantially as described, whereby the upper surface of said block or shell may be vertically adjusted with relation to the spindle, as set forth.

5. Radial hat-stretching ribs provided with a curved pivotal slot and a curved guiding-slot, in combination with a rib-block provided with segmental guides, substantially as described.

6. The combination, with the ribbed former mounted on a spindle, of a treadle, rock-shaft, levers, and rods, substantially as described, whereby the former is elevated, and the vertical strain of the stretching devices is borne by the rock-shaft, as set forth.

7. The several vibrating stretching devices independently and separately mounted, in combination with individual pivotal connections, provided with a bolt and nut, substantially as described.

8. The combination, with the vibrating brim-stretching fingers and the ribbed former, of the stripping-weight, mounted above the stretching-fingers, substantially as described, whereby the hat is forced downward with the former, out of contact with the stretching-fingers, as set forth.

9. The combination, with the spreading-ribs and their actuating-lever, of the cross-head and the jointed rods, substantially as described, whereby, in spreading the ribs, the jointed rods are made to assume nearly a vertical position, and cause the cross-head to bear the increased downward thrust on the ribs incident to their being spread, as set forth.

RUDOLF EICKEMEYER.

Witnesses:
G. OSTERHELD,
JAS. G. WOODWORTH.